Sept. 14, 1954  F. A. SMALLEY  2,689,147
HAND TOOL FOR KNOT-SPLICING LINES
Filed Nov. 3, 1952
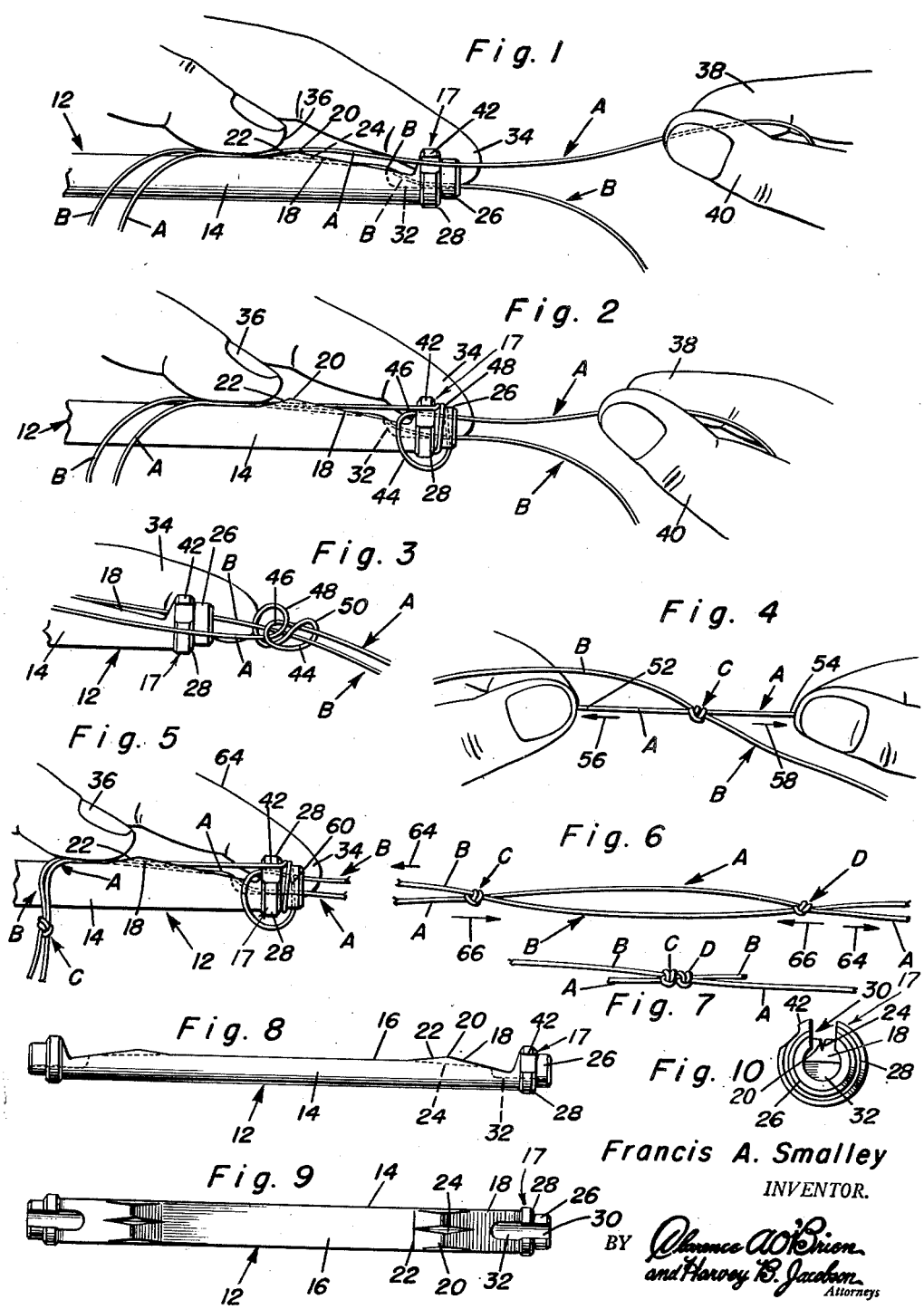
Francis A. Smalley
INVENTOR.

Patented Sept. 14, 1954

2,689,147

UNITED STATES PATENT OFFICE 2,689,147

HAND TOOL FOR KNOT-SPLICING LINES

Francis A. Smalley, Blackwell, Okla.

Application November 3, 1952, Serial No. 318,371

3 Claims. (Cl. 289—17)

The present invention relates to a novel method and means whereby cooperating free ends of flexible lines, fishing lines for example, may be knot-spliced and thus successfully and reliably joined with one another.

The obvious purpose of the invention is to provide a fisherman with a handy easy-to-use tool which is simple, economical and practical, may be conveniently carried in one's pocket or tackle box and which makes it readily possible and enables the user to carry out the steps of a unique method and results in enabling the user to knot-splice a flexible leader to one end of a fishing line or to join portions of fishing lines together.

Briefly summarized, the method aspect of the disclosure has to do with joining, that is knot-splicing, complemental free ends of two lines wherein the free end of one line is double-wrapped around the adjacent free end of the other line with the wrappings knotted together but left sufficiently loose to slide along said other line, the opposite free end of said other line being likewise double-wrapped around the adjacent free end of said one line at a longitudinally spaced point and loosely knotted on the latter, the then outer free ends of the respective lines being grasped by hand and pulled in directions away from each other, whereby the two loose knotted wrappings are slid together so that the wrappings are brought into abutting relation, after which the respective knots are drawn up tightly to stay put in abutting contact with one another.

Another object of the invention has to do with a tool enabling the aforementioned and procedural steps to be more aptly and satisfactorily pursued. To this end a tool is provided which takes the form of a so-called holder, preferably one which is rigid and constructed from suitable material, commercial plastics for example, said holder embodying a rigid handle having means at one end for holding a portion of one line steadily in a given position and core forming condition, and having complemental means at the same end which aptly serves to permit the free end of the other line to be held in the hand, wrapped around said one line in a manner so that it is slidingly tied to the latter.

More specifically revealed the preferred embodiment of the tool is characterized by a holder having a handle which is adapted to be held in one hand, said handle having an eye formed with a line coiling mandrel, said mandrel being provided with a shoulder to facilitate the coiling steps and further provided with a detent which serves as a sort of hook and facilitates the step of coiling the line while held against displacement in one direction by said shoulder.

Then, tool, novelty is predicated upon using an eye which has a center axially disposed opening and is radially split and thus provided with a slot forming a mouth for insertion and removal of the respective lines, a surface of the handle adjacent to the eye being shaped up to facilitate the step of holding two cooperating ends of the lines with the thumb of the left hand while using the other hand to take care of the coiling and tying steps.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view showing a fragmentary end portion of the holding and tying tool and illustrating the first step of associating the cooperating ends of the two lines and the position of the left hand and right hand relative to each other;

Figure 2 is a view in elevation based on Figure 1 showing the essential procedures involved in the second step, the coiling, wrap around and knot forming step;

Figure 3 is a view also in elevation showing the coils or wrappings dislodged from the line coiling mandrel, a step which is necessary preparatory to tightening up the knot;

Figure 4 is an elevational view showing how the knot is finally formed, this being the first positive connection between the two lines;

Figure 5 is an elevational view based on Figure 2 and showing the second knot forming the tying step which results in joining the lines together at longitudinally spaced points as shown for example in Figure 6;

Figure 6 is an elevational view in which the tool itself is not involved and wherein opposite ends of the respective lines are pulled in outward directions to slide the two knots toward each other;

Figure 7 is a view based on Figure 6 and showing the final stage wherein the two knots are now jammed against each other and tightly tied to finish the knot-type splice;

Figure 8 is an elevational view of the hand tool itself which is used for knot splicing lines in the manner shown in Figures 1, 2, 3, and 5;

Figure 9 is a top plan view of the tool; and,

Figure 10 is an enlarged end view of the same observing it in a direction, for example, from right to left.

By way of introduction to the detail description it is to be pointed out that under the procedure or method involved it is possible to pursue the essential method steps, particularly those revealed in Figures 4 to 7 inclusive for knot splicing free end portions of coacting flexible lines. It is evident, however, that the special tool herein provided is the instrumentality which makes possible the forming and tying of satisfactory knots.

It seems advisable, before delving into the method aspects of the matter, to describe the tool. The tool, as a single entity or instrumentality, is denoted by the numerals 12. It may be of metal, perhaps even wood but in actual practice it is contemplated that commercial plastics will be used. This is to provide the properties of rigidity, economy and durability. Not only this, since fishing lines are often wet, it is desirable to utilize a material which is substantially non-corrodible in nature. The tool is shown provided at both ends with coiling and knot forming means. This selectively usable idea is to render the tool more easily usable. Insofar as the instant disclosure is concerned, the means at one end is the essence of the invention.

The tool may be said to take the form of a shank or handle 14 which is rigid and substantially straight. As best shown in Figure 9, the handle is substantially semi-cylindrical in cross-section and therefore provides a flat top surface 16. To the right, a portion of said surface slants or inclines and is substantially flat, this portion being denoted at 18. There is also a slightly elevated portion 20 having a thumb hold-down surface or portion 22. Referring to Figure 8, the side elevation of the portion 22 is shown and, as shown in Figure 9, there is a central keeper groove 24 for an end portion of one of the lines (to be hereinafter referred to). There is an eye 17 formed at the outer end of the incline 18 and a portion of this eye inturn provides a ring-like line coiling mandrel 26 having an associated shoulder 28. A slot or notch is provided at 30 and this radiates from the center opening of the eye, opens through the periphery thereof and forms a line inserting and removing mouth. There is a longitudinal groove at 32 which extends through the axial opening in the eye 17 and also registers with the inclined surface 18. This inclined surface and the groove provide the required clearance for one of the line threading steps to be described. It will be understood therefore that the tool preferably has the structural characteristics shown with particularity in Figures 8, 9 and 10.

The several views of the drawings reveal a systematic step-by-step method wherein cooperating free ends of two lengths or pieces of flexible elements may be spliced together. It will be sufficient, it is believed, to assume that one length or piece of a fishing line is to be tied and adjoined securely to a second piece. It will be clear therefore that A designates one line and B designates the other lines. The tool 12 is held in the left hand with the index finger 34 resting against one side of the shouldered mandrel 26. An intermediate portion of the line B is simply laid in place as shown. That is to say, the intermediate portion is situated in the clearance groove 32 and therefore the right hand end extends through the opening in the eye or mandrel. The opposite end rests atop the holder and may, if desired, be placed in the keeper groove 24. The free end portion is held down with the thumb 36. The same or corresponding end of the line A is also placed against these surfaces 16 and 22 and the same thumb comes in to play here. The right hand end portion of the line A is grasped between the index finger 38 and thumb 40 of the right hand. The intermediate portion is then engaged beneath the detent or hook 42. This positions the line so that it may be twice wrapped or wound around the mandrel 26 in the manner shown in Figure 2. The second winding is continued now into what may be called a return bend 44 and the adjacent portion 46, which may be called a re-entrant terminal is passed from left to right through the opening means in the eye which, of course, means passing said portion through the two windings or coils denoted at 48 and 50 and best seen in Figure 3. The next step as shown in Figure 3 involves pushing the windings and partly tied knot off of the mandrel. In Figure 3 the wrappings are shown loose and before they are drawn up. Now both lines are completely disconnected from the tool, and as shown in Figure 4 the end portions 52 and 54 of the line A are pulled in directions away from each other, that is in the directions of the arrows 56 and 58. This results in tying the wrappings into a knot. It is to be explained, however, that this is to be left partly loose so that the knot which is here called an 8-shaped knot may slide longitudinally on the line B. With one knot thus partially formed it is desirable to form a second longitudinally spaced knot which is shown in Figure 6. To do this the first knot C is placed atop the flat surfaces 16 and 22 and the step which is shown in Figure 2 is repeated only in reverse. By this is meant that we are now tying a longitudinally spaced portion of the line B around the line A. So, as shown in Figure 5 the line A is now seated in the groove 34 and passes through the aperture or opening in the eye or mandrel 26. The line B is twisted in the manner shown in Figure 2. That is to say, line B is engaged underneath of the hook 42 and is wrapped at 60 twice around the mandrel and is then formed into a return bend 62 with the re-entrant portion 64 being passed through the opening in the eye in the direction from right to left. In Figure 2 the line B is in the groove and in Figure 5 the line A is in the groove; otherwise the steps are the same. The idea is to tie a knot in A to encircle B which knot is denoted at C and then tie a similar knot in B which encircles A which knot is denoted at D. What with these knots tied as shown in Figure 6 the user catches hold of A to the right of the knot D and B to the left of the knot C and these ends are pulled in the directions of the arrows 64—64. This means that the knots C and D now travel toward each other in the direction of the arrows 66—66. The result is that the two knots come together in abutting and jamming relationship as shown in Figure 7 and the surplus ends are clipped off with a pair of scissors or the like and the two ends are thus securely knot-spliced. A secure connection is assured.

It is believed that a studied consideration of the objects of the invention, the detailed description in conjunction with the accompanying drawings and the procedural steps of procedure followed will afford the reader a comprehensive understanding of the method steps which are pursued and the unique instrumentality which

What is claimed as new is as follows:

1. A hand tool for holding complemental free end portions of two flexible lines in a predetermined manner so that they may be knot-spliced together comprising an elongated holder embodying a rigid handle adapted to be held in one hand, said handle being provided at one end with an eye, said eye having a centered axial opening and also having a slot radiating from said center opening and opening through the periphery of said eye and providing a line inserting and removing mouth, and a portion of said eye forming a line coiling mandrel, said mandrel being provided on its coiling surface with an outstanding shoulder and being, in addition, provided with a cooperating readily accessible detent.

2. The structure defined in claim 1, wherein that portion of the handle which is adjacent said eye is reduced in cross-section so that both lines may be threaded unobstructedly through said line inserting and removing mouth.

3. The structure defined in claim 1, wherein at least one surface of the handle in close proximity to said eye is substantially flat and slants toward the lower half-portion of the axial center opening in said eye and assists in locating the cooperating free ends of the respective lines.

References Cited in the file of this patent

UNITED STATES PATENTS

| Number | Name | Date |
|---|---|---|
| 604,759 | Johnson | May 31, 1898 |
| 2,234,190 | Noling | Mar. 11, 1941 |
| 2,239,342 | Rosenfelder et al. | Apr. 22, 1941 |

OTHER REFERENCES

Encyclopedia of Knots, by Raoul Graumont and John Hansel, third edition of the Cornell Maritime Press, N. Y., 1945. Page 612, Fig. 8, plate 326.